United States Patent
Lammel et al.

[11] 3,792,612
[45] Feb. 19, 1974

[54] SAFETY INTERLOCK FOR A PARTICULATE SOLIDS SAMPLER

[75] Inventors: David G. Lammel, Manhattan Beach; Ronnie C. Neidigh, Anaheim, both of Calif.

[73] Assignee: Chevron Research Company, San Francisco, Calif.

[22] Filed: Feb. 1, 1973

[21] Appl. No.: 328,801

[52] U.S. Cl........ 73/421 B, 73/422 TC, 137/637.1, 251/114
[51] Int. Cl. ............................................. G01n 1/10
[58] Field of Search........ 73/421 R, 421 B, 422 TC; 251/89, 111, 114, 115, 116; 137/637.1

[56] References Cited
UNITED STATES PATENTS

| 1,154,048 | 9/1915 | Oare | 251/116 |
| 1,167,257 | 1/1916 | Best | 251/116 |
| 2,085,007 | 6/1937 | Conrath | 73/422 |
| 3,487,695 | 1/1970 | Haunschild | 73/421 B |

Primary Examiner—S. Clement Swisher
Attorney, Agent, or Firm—G. F. Magdeburger; R. H. Davies; J. D. Foster

[57] ABSTRACT

An apparatus for withdrawing samples of particulate solids, e.g., catalysts, from a bed of particulate solid material located in a vessel. The apparatus prevents simultaneous opening of both sampler valves which can lead to fire or personal injury, since the material is normally under superatmospheric pressure and at elevated temperatures. The apparatus comprises a sample receiver, an inlet and outlet valve, and an interlock for the valves to insure that both cannot be opened simultaneously.

3 Claims, 1 Drawing Figure

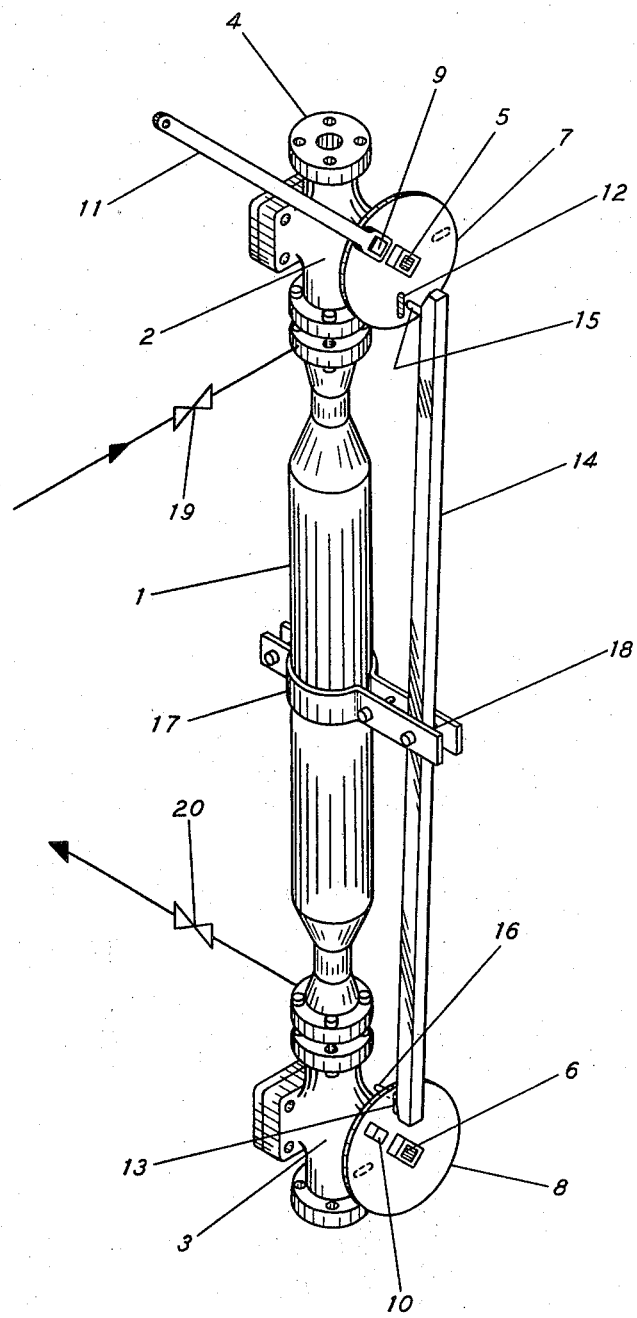

SAFETY INTERLOCK FOR A PARTICULATE SOLIDS SAMPLER

BACKGROUND OF THE INVENTION

Numerous chemical conversions utilize catalysts in closed reactor vessels. For example, various hydrocarbon conversion processes, such as reforming, hydrocracking, hydrogenation, hydrodesulfurization and the like, utilize catalyst components in a fixed bed operated at superatmospheric pressure (ranging from a few psi to several thousand psi) and elevated temperatures. These catalysts are subject to poisoning by metallic contaminants, carbonaceous materials, and other components of the feed to the reactor vessel, such as sulfur and nitrogen. Accumulation of these materials on the catalyst particles reduce the catalytic activity and in severe cases can cause plugging of the catalyst bed. It is desirable then to have some means for determining the level of and the nature of catalyst contamination so that catalyst regeneration can be carried out effectively and the timing of ultimate shutdown and replacement of the catalysts can be forecast.

Since operation of catalyst reactors is an expensive proposition, means for obtaining catalyst samples while the reactor is onstream is particularly important. This means obtaining a sample which may be at 600° or 700° F. and several thousand pounds pressure. The catalyst sample needs to be obtained easily and inexpensively without the risk of fire or injury to personnel. This invention is directed to such an apparatus.

DESCRIPTION OF THE PRIOR ART

A number of devices for withdrawing samples of catalysts have been described in the prior art. For example, U. S. Pat. No. 3,653,265 uses the differential pressure between the vessel and a solids receiver to carry a catalyst sampler from a bed of the solids in the vessel to a tubular sampler and into the receiver where the sample is purged and cooled. Another example is U. S. Pat. No. 3,654,143, which teaches the use of a suction nozzle to suck catalyst and reaction liquid from the reaction vessel.

No catalyst sampling device is known to subject inventors which provides a straightforward and safe method for obtaining samples from a reaction vessel operating under pressure and at elevated temperatures. U. S. Pat. Nos. 2,371,727 and 2,709,452, do teach a valve interlock mechanism. The U.S. Pat. No. 2,371,727 utilizes the shaped slots and the shaped lug portions for preventing the opening of the main valve of a burner system until after the pilot valve has first been closed. The U.S. Pat. No. 2,709,452 described an interlock bar system for preventing two valves from being simultaneously opened. The interlock bar has recesses at each end to engage the lugs on the valve levers positioned to hold one valve lever in a fixed position upon unseating the other lug from its corresponding bar recess.

SUMMARY OF THE INVENTION

The subject invention is directed to a particulate solids sampler comprising:

1. a sample receiver;
2. a particulate solids inlet valve having a valve stem rotatable about the longitudinal axis thereof to actuate the inlet valve;
3. a particulate solids outlet valve having a valve stem rotatable about the longitudinal axis thereof to actuate the outlet valve;
4. a valve stem rotation means secured to the stem of the inlet valve for rotating the inlet valve stem;
5. a valve stem rotation means secured to the stem of the outlet valve for rotating the outlet valve stem;
6. interlock means comprising a movably mounted element having a first end and a second end, constructed and arranged to permit alternatively:
   a. the first end of the element upon movement of the element in one direction to move into valve stem rotation prevention engagement with the inlet valve stem rotation means when the inlet valve is closed, and the second end of the element to disengage the outlet valve, and
   b. the second end of the element upon movement of the element in the other direction to move into valve stem rotation prevention engagement with the outlet valve stem rotation means when the outlet valve is closed, and the first end of the element to disengage said inlet valve.

BRIEF DESCRIPTION OF THE DRAWING

The drawing is a perspective illustration of the sampler showing both valves in a closed position (solid lines) with the outlet valve locked in a closed position and the inlet valve unlocked (but in a closed position) in preparation for opening of the inlet valve (dotted lines).

DETAILED DESCRIPTION OF THE INVENTION

The subject invention is directed to a particulate solid sampler having a safety interlock means to prevent both the inlet and outlet valve to the sampler from being open at the same time with the possibility of fire and injury to personnel.

A more comprehensive understanding of the concept of this invention can be obtained by reference to the drawing. In the preferred embodiment depicted in the drawing, a sample receiver 1 has an inlet valve 2 and an outlet valve 3 attached to opposite ends. The sample receiver is connected to the reactor at the upper end 4 of valve 2. Valves 2 and 3 have respective valve stems 5 and 6. To these valve stems are attached respective valve rotation means (discs) 7 and 8. Respective discs 7 and 8 have respective lugs 9 and 10 to aid in rotation of the corresponding discs and, consequently, opening and closing of the inlet and outlet valves, respectively, by the use of lug wrench 11. The discs 7 and 8 have respective radially disposed slots 12 and 13. These slots are positioned on the discs so that when the slots are in vertical alignment with each other, the corresponding inlet and outlet valves are in a closed position. A bar 14 is pivotally mounted in alignment with slots 12 and 13 (when the valves are in a closed position) by supporting clamp 17 which allows tilting movement of the respective ends of bar 14 toward and away from locking plates 7 and 8 through fixed pivot point 18. Pins 15 and 16 extending laterally from the bar at each end thereof and towards said respective locking discs 7 and 8 engage respective slots 12 and 13 when respective valves 2 and 3 are in a closed position and tilt bar 14 is tilted toward the respective disc. To prevent the possibility of simultaneous opening of both valves, either pins 15 or 16, and preferably both, should be long enough to engage their corresponding slot when the bar is in a vertical position.

In the drawing, tilt bar 14 is tilted toward outlet valve 3 and pin 16 engages slot 13, thereby locking outlet valve 3 in a closed position. The upper end of bar 14 and corresponding pin 15 are tilted away from inlet valve 2, thereby disengaging pin 15 from slot 12, allowing locking disc 7 to be rotated, thereby opening inlet valve 2.

In operation, the catalyst sample may be obtained as follows. Both inlet valve 2 and outlet valve 3 are intially closed. Valve 19 is opened to pressurize the sample receiver 1 to a pressure at least as high as the presssure in the reactor, and preferably about 25 to 50 lbs. above the reactor outlet pressure at 4. After sample receiver 1 is pressurized, valve 19 is closed. Inlet valve 2 is then opened by tilting locking bar 14 toward outlet valve 3 so that the pin 16 engages slot 13. As previously noted, this is only possible when outlet valve 3 is in a closed position, i.e., slot 13 is in alignment with locking bar 14. Outlet valve 3 is now locked closed. Inlet valve 2 is free to open by rotating the locking disc 7 90° in a counterclockwise direction (see dotted slot 12 on disc 7). It is now impossible to open outlet valve 3 since an attempt to tilt locking bar 14 toward inlet valve 2 would result in pin 15 contacting locking disc 7 before pin 16 disengages slot 13. On opening of inlet valve 2, catalyst material together with reactants enters sample receiver 1. The initial pressure in sampler 1 is preferably at least as high as the reactor outlet pressure at 4 or higher to prevent catalysts from being prematurely drawn into the sampler. Inlet valve 2 is then closed by rotating locking plate 7 90° in a clockwise direction to realign slot 12 with pin 15. The catalyst sample together with reactants is then allowed to cool. Valve 20 is then opened to depressurize sample receiver 1 and remove reactants therefrom. Valve 20 is then closed and outlet valve 3 is opened by tilting tilt bar 14 toward inlet valve 2 engaging pin 15 in slot 12 and disengaging pin 16 from slot 13. Valve 3 is opened by rotating plate 8 in a counterclockwise direction 90°. Note that catalyst cannot flow directly from the reactor to the outlet valve since inlet valve 2 is now locked closed by engagement of locking pin 15 with slot 12 in plate 7.

As noted, the catalyst drawn into sample receiver 1 should be allowed to cool before opening outlet valve 2. The cooling of the catalyst sample can be expedited by alternating pressurizing of the sample receiver 1 by sequentially (1) opening valve 19 with all other valves in closed position, (2) closing valve 19, and (3) opening vent relief valve 20.

Various modifications and changes in arrangements shown can be made without departing from the scope of the invention. For example, supporting clamp 17 need not be mounted on sample receiver 1. All that is required when a pivotally mounted element such as bar 14 is used is that a fixed pivot point for the tilt bar be provided. Alternatively, the locking plates may have a raised portion preventing tilting of the tilt bar toward the locking plate except when a recessed portion in the raised portion of the locking plate is aligned with the tilt bar and the corresponding valve is in a closed position. Also, a sliding bar having ends fitting into notches in the valve rotation means could also be used.

Further, the apparatus can be used without pressurizing and vent lines, particularly when low pressures are utilized in the reactor.

Other modifications and changes will become apparent to those skilled in the art from the foregoing description.

We claim:
1. A particulate solids sampler comprising:
    1. a sample receiver;
    2. a particulate solids inlet valve secured to and communicating when open with said receiver, said valve having extending from the main body thereof a first valve stem rotatable about the longitudinal axis thereof to actuate said inlet valve;
    3. a particulate solids outlet valve secured to and communicating when open with said receiver, said valve having extending from the main body thereof a second valve stem rotatable about the longitudinal axis thereof to actuate said outlet valve;
    4. a first valve stem rotation means secured to said first valve stem for rotating said inlet valve stem;
    5. a second valve stem rotation means secured to said second valve stem for rotating said outlet valve stem;
    6. interlock means comprising a movably mounted element having a first end and a second end, said means constructed and arranged to permit alternatively:
        a. said first end of said element upon movement of said element in one direction to move into valve stem rotation prevention engagement with said first valve stem rotation means when said inlet valve is closed, and said second end of said element to disengage said outlet valve, and
        b. said second end of said element upon movement of said element in the other direction to move into valve stem rotation prevention engagement with said second valve stem rotation means when said outlet valve is closed, and said first end of said element to disengage said inlet valve.

2. The sampler of claim 1 wherein said movably mounted element is a bar pivotally mounted at an intermediate position along the length of said bar.

3. The sampler of claim 2 wherein:
    1. said first valve stem rotation means is a first plate having a first slot therein and said second valve stem rotation means is a second plate having a second slot therein; and
    2. said bar is further characterized by a first pin secured to and projecting laterally from said first end and a second pin secured to and projecting laterally from said second end; said first pin and said second pin constructed and arranged to engage said first slot when said inlet valve is closed and said second slot when said outlet valve is closed, respectively, and to permit alternatively:
        a. said first pin upon movement of said bar in one direction to move into valve stem rotation prevention engagement with said first slot when said inlet valve is closed, and said second pin to disengage said second slot; and
        b. said second pin upon movement of said bar in the other direction to move into valve stem rotation prevention engagement with said second slot when said outlet valve is closed, and said first pin to disengage said first slot.

* * * * *